(12) United States Patent
Shen et al.

(10) Patent No.: US 10,116,989 B1
(45) Date of Patent: Oct. 30, 2018

(54) BUFFER REDUCTION USING FRAME DROPPING

(71) Applicant: Twitch Interactive, Inc., San Francisco, CA (US)

(72) Inventors: Yueshi Shen, Cupertino, CA (US); Ivan Marcin, Palo Alto, CA (US); Josh Tabak, San Francisco, CA (US); Abhinav Kapoor, Fremont, CA (US); Jorge Arturo Villatoro, San Francisco, CA (US); Jeff Li, San Francisco, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 58 days.

(21) Appl. No.: 15/262,429

(22) Filed: Sep. 12, 2016

(51) Int. Cl.
*H04N 21/44* (2011.01)
*H04L 29/06* (2006.01)
*H04N 21/439* (2011.01)
*H04N 21/2187* (2011.01)
*H04N 21/442* (2011.01)
(Continued)

(52) U.S. Cl.
CPC ....... *H04N 21/44004* (2013.01); *H04L 65/60* (2013.01); *H04N 21/2187* (2013.01); *H04N 21/4392* (2013.01); *H04N 21/4398* (2013.01); *H04N 21/44016* (2013.01); *H04N 21/44209* (2013.01); *H04N 21/440281* (2013.01); *H04N 21/8547* (2013.01)

(58) Field of Classification Search
CPC ........... H04N 21/2187; H04N 21/4392; H04N 21/4398; H04N 21/44004; H04N 21/44016; H04N 21/440281; H04N 21/44209; H04N 21/8547
See application file for complete search history.

(56) References Cited

U.S. PATENT DOCUMENTS

| | | | |
|---|---|---|---|
| 6,741,796 B1 * | 5/2004 | Heo | G11L 319/12 386/244 |
| 2005/0232284 A1 * | 10/2005 | Karaoguz | H04L 12/66 370/401 |
| 2007/0201500 A1 | 8/2007 | Deshpande | |

(Continued)

OTHER PUBLICATIONS

U.S. Appl. No. 15/262,521; Non-Final Office Action; dated Aug. 30, 2017; 12 pages.
U.S. Appl. No. 15/262,521, filed Sep. 12, 2016, Shen et al.

*Primary Examiner* — Nicholas T Corbo
(74) *Attorney, Agent, or Firm* — Baker & Hostetler LLP

(57) ABSTRACT

The techniques described herein may, for example, allow a quantity of buffered video frames to be reduced, for example for use in adaptive bitrate (ABR) streaming and other streaming transmissions. The quantity of buffered video frames may be reduced by dropping certain selected buffered frames from a resulting video output that is displayed to the viewer. This may reduce end-to-end latency without requiring a change in frame rate or fast forwarding of the video output, which may sometimes not be available or permitted by a resulting video player. These buffer reduction techniques may sometimes be employed upon a determination that transmission conditions have stabilized and that holding large quantities of buffered video may be unnecessary. In some examples, the disclosed techniques may be particularly advantageous for live streaming scenarios, in which end-to-end latency may be particularly problematic for the viewer.

19 Claims, 10 Drawing Sheets

(51) Int. Cl.
*H04N 21/4402* (2011.01)
*H04N 21/8547* (2011.01)

(56) References Cited

U.S. PATENT DOCUMENTS

| | | | |
|---|---|---|---|
| 2009/0059818 A1* | 3/2009 | Pickett | H04L 12/2856 370/259 |
| 2014/0168354 A1* | 6/2014 | Clavel | H04N 7/152 348/14.09 |
| 2014/0270680 A1* | 9/2014 | Bloch | G11L 327/11 386/201 |
| 2016/0205164 A1 | 7/2016 | Schmidt et al. | |
| 2017/0318323 A1* | 11/2017 | Wang | H04N 21/4302 |

* cited by examiner

Equation 810

$$ATSD(N) = ATSD(P) + \left(\frac{\text{\# Samples in AF}}{SF(original)}\right) - \left(\frac{\text{\# Samples in AF}}{SF(increased)}\right)$$

Key 815

ATSD(N) = New Audio Timestamp Difference

ATSD(P) = Prior Audio Timestamp Difference

Samples in AF = Number of Samples in Audio Frame

SF(original) = Original Sampling Frequency

SF(increased) = New Sampling Frequency

FIG. 8

BUFFER REDUCTION USING FRAME DROPPING

BACKGROUND

The transmission of audio and video content using various communications networks has increased dramatically in recent years. One popular transmission technique for such content is adaptive bitrate (ABR) streaming, in which audio and video quality may be periodically adjusted throughout transmission, for example in response to changing and/or unstable network conditions. One characteristic of ABR streaming is that a client typically holds multiple seconds of video in its player video frame buffer. This buffering is particularly advantageous to minimize stalling of playback when network conditions deteriorate. However, while buffering in this manner may provide advantages for deteriorating and/or unstable network conditions, the buffering may also be disadvantageous, for example in scenarios when network conditions have improved and/or stabilized. For example, buffering in this manner may contribute significantly to end-to-end latency. In particular, the amount of buffered video may not decrease even after a network condition improves, and, therefore, the end-to-end latency may not be reduced throughout the entire course of a streaming session. In some examples, this contribution to end-to-end latency may be particularly problematic for live streaming scenarios, in which video of a live event (e.g., video game, news event, sports event, etc.) may be captured, transmitted, and viewed while the event is occurring live. For example, live streaming video of a basketball game may be less enjoyable when a radio broadcast of the same event may reveal the outcomes of plays before they can be seen using the live streaming video transmission.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 8 is a diagram illustrating an equation representing example logic for calculating an audio timestamp difference in association with the process of FIG. 7 that may be used in accordance with the present disclosure.

DETAILED DESCRIPTION

Figure 1:
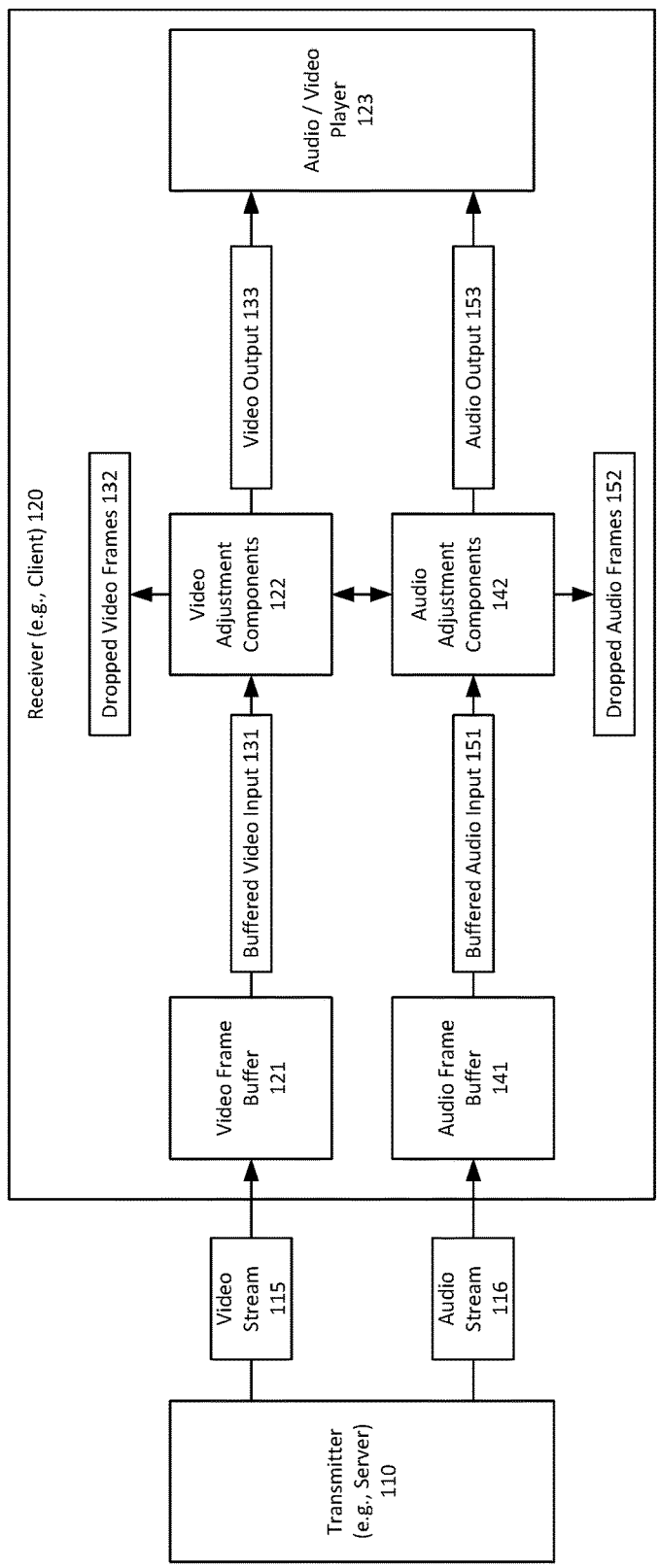
FIG. 1 is a diagram illustrating an example system for buffer reduction using frame dropping that may be used in accordance with the present disclosure.

Techniques for buffer reduction using frame dropping are described herein. In some examples, audio and video content may be transmitted over one or more communications networks, for example using adaptive bitrate (ABR) streaming techniques, in which audio and video quality may be periodically adjusted throughout transmission, for example in response to changing and/or unstable network conditions. In some cases, the transmitted content may be transmitted using live streaming techniques, in which audio and video of a live event (e.g., video game, news event, sports event, etc.) is captured, transmitted, and displayed during occurrence of the live event. Input audio and video streams may be received by the client, buffered, and then provided as output for presentation to a viewer. For example, incoming video content may be received by the client, temporarily (e.g., for multiple seconds) stored in a video frame buffer, and then provided as video output for display.

In some examples, at some time during the transmission of the content, the client may determine that one or more network conditions associated with the transmission are stable. This may be determined, for example, by monitoring network conditions (e.g., bandwidth, loss rates, etc.) and determining that the network conditions have remained favorable and/or stable (e.g., above a particular threshold, within a particular range, etc.), for example for at least a particular threshold time duration. In response to such a determination of stability, the client may then determine to reduce a quantity of video frames that are stored in the video frame buffer, thereby potentially reducing end-to-end latency.

The techniques described herein may, for example, allow the quantity of buffered video frames to be reduced by dropping certain selected buffered frames from a resulting video output that is displayed to the viewer. This selective dropping of frames causes the additional frames to be prematurely pulled from the buffer and inserted into the video output, thereby reducing the quantity of frames stored in the buffer. In some examples, this may enable buffer reduction and reduced end-to-end latency without requiring a change in frame rate or fast forwarding of the video output, which may sometimes not be available or permitted by the resulting video player and/or desired by the viewer. This may enable identical buffer reduction techniques to be employed across different client platforms (e.g., different web browsers, etc.).

In some examples, upon determining to reduce the quantity of buffered video frames, the client may determine a frame drop quantity threshold, which may be a maximum quantity of video frames that are permitted to be dropped from the video output. The client may also select a frame drop frequency threshold, which may be a maximum frequency (e.g., one out of ten frames) of video frames that are permitted to be dropped from the video output. The client may then examine the buffered video frames and then select various buffered frames for dropping. In some examples, a video frame may be selected for dropping based, at least in part, on a quantity of dropped video frames, a frequency of dropped video frames, and/or whether the video frame is a reference frame. For example, in some cases, a video frame may be dropped when the video frame is a non-reference frame, when dropping of the video frame will not exceed the frame drop quantity threshold, and when dropping of the video frame will not exceed the frame drop frequency threshold. Otherwise, the video frame may not be dropped.

Each of the buffered video frames may, in some examples, have a respective timestamp associated with the video frame buffer, referred to herein as source video timestamp. The source video timestamp may, for example, indicate a relative time at which a respective video frame would be presented in the video output if no video frames were dropped. Thus, the source video timestamp does not account for dropped video frames. In some examples, a respective destination video timestamp associated with the video output may be assigned to each undropped video frame that is included in the video output. The destination video timestamp may, for example, indicate a relative time at which a respective video frame will be presented in the video output and may also account for dropped video frames. A video timestamp difference may also be determined for each undropped video frame, which is the difference between the source and destination timestamps for the respective video frame.

In some examples, buffered audio frames may also be dropped from the resulting audio output presented to the viewer. In some cases, similar to the video frames, each buffered audio frame may have a respective source timestamp associated with the audio frame buffer, referred to herein as source video timestamp. The source audio timestamp may, for example, indicate a relative time at which a respective audio frame would be presented in the audio output if no audio frames were dropped. Thus, the source audio timestamp does not account for dropped audio frames. In some examples, a respective destination audio timestamp associated with the audio output may be assigned to each undropped audio frame that is included in the audio output. The destination audio timestamp may, for example, indicate a relative time at which a respective audio frame will be presented in the audio output and may also account for dropped audio frames. An audio timestamp difference may also be determined for each undropped audio frame, which is the difference between the source and destination timestamps for the respective audio frame.

In some examples, in order to help ensure that the respective audio content remains relatively well synchronized to the video content, audio frames may only be dropped when certain conditions are met. For example, in some cases, audio frames may be dropped based, at least in part, on a relationship between the audio timestamp difference and the video timestamp difference. In one specific example, audio frames may be prohibited from being dropped when the video timestamp difference is less than the audio timestamp difference in combination with an additional amount, such as half of the audio frame duration. Otherwise, the audio frames may be dropped.

FIG. 1 is a diagram illustrating an example system for buffer reduction using frame dropping that may be used in accordance with the present disclosure. As shown in FIG. 1, a transmitter 110, such as a server, transmits a video stream 115 and a corresponding audio stream 116 to a receiver 120, such as a client. Video stream 115 and audio stream 116 may be transmitted from transmitter 110 to receiver 120 using one of more communications networks, for example one or more local area networks (LANs) or one or more wide area networks (WANs) such as the Internet. Video stream 115 and audio stream 116 may be transmitted using streaming data transmission techniques, for example in which some portions of the transmitted data may be played by the receiver 120 while subsequent portions of the transmitted data are being transmitted to the receiver 120.

Video stream 115 and audio stream 116 may both correspond to a particular transmitted content item (e.g., video game, movie, other media, etc.). Additionally, in some examples, video stream 115 and audio stream 116 may be transmitted using live streaming techniques, in which audio and video of a live event (e.g., video game, news event, sports event, etc.) is captured, transmitted, and displayed during occurrence of the live event. For example, for live streaming video and audio for a live event, at least part of video output 133 and at least part of audio output 153 may be played during at least part of the live event. In one specific example, a video game may be captured using screen capture software at a user device and then transmitted using live streaming techniques to receiver 120, thereby enabling a feed of the video game to be presented at receiver 120 while the video game is being played.

As shown in FIG. 1, incoming video from video stream 115 may be temporarily stored in video frame buffer 121 before being provided to audio/video player 123. Additionally, incoming audio from audio stream 116 may be temporarily stored in audio frame buffer 141 before being provided to audio/video player 123. Audio/video player 123 may play the received audio and video to a user, for example for presentation via a video display or monitor, one or more audio speakers, and the like. In some examples, video stream 115 and audio stream 116 may be transmitted using adaptive bitrate (ABR) streaming techniques, in which audio and video quality may be periodically adjusted throughout transmission, for example in response to changing and/or unstable network conditions. One characteristic of ABR streaming is that a receiver 120 typically holds multiple seconds of video in its video frame buffer 121. As set forth above, buffering in this manner may contribute significantly to end-to-end latency. As also set forth above, this contribution to end-to-end latency may be particularly problematic for live streaming scenarios. For example, live streaming video of a basketball game may be less enjoyable when a radio broadcast of the same event may reveal the outcomes of plays before they can be seen using the live streaming video transmission.

For these and other reasons, in the example of FIG. 1, receiver 120 includes video adjustment components 122 and audio adjustment components 142, which may operate in combination with one another to reduce a quantity of video frames that are stored in video frame buffer 121, thereby reducing end-to-end latency. In particular, as shown in FIG. 1, video adjustment components 122 may examine buffered video input 131 from video frame buffer 121 in order to select one or more dropped video frames 132. Video adjustment components 122 may then extract and drop the dropped video frames 132 from a resulting video output 133 that is provided to audio-video player 123 for presentation to the user. As also shown in FIG. 1, audio adjustment components 142 may examine buffered audio input 151 from audio frame buffer 141 in order to select one or more dropped audio frames 152. Audio adjustment components 142 may then extract and drop the dropped audio frames 152 from a resulting audio output 153 that is provided to audio-video player 123 for presentation to the user. The above described processes of dropping video and audio frames will be described in greater detail below.

Figure 2:
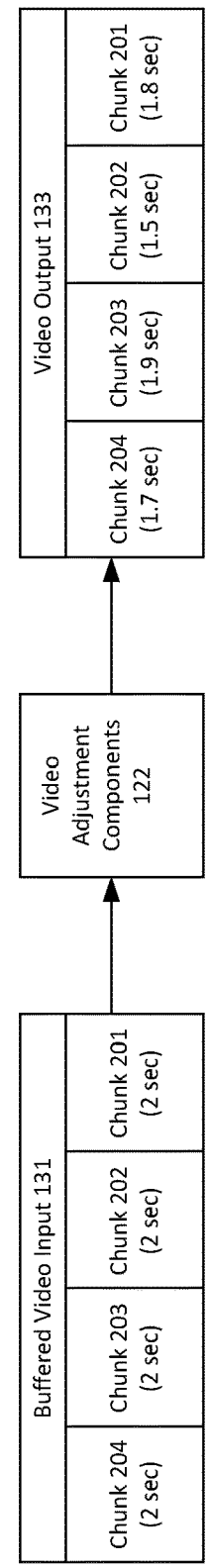
FIG. 2 is a diagram illustrating example buffered video input and adjusted video output that may be used in accordance with the present disclosure.

Referring now to FIG. 2, some examples of buffered video input 131 and adjusted video output 133 will now be described in detail. In particular, in the example of FIG. 2, a sample portion of buffered video input 131 includes four chunks 201-204. Each chunk 201-204 in buffered video input 131 includes two seconds of video data. As also shown in FIG. 2, after adjustment by video adjustment components 122, chunks 201-204 included in video output 133 may be reduced in duration relative to chunks 201-204 in buffered video input 131. For example, chunk 201 is shortened to 1.8 seconds, chunk 202 is shortened to 1.5 seconds, chunk 203 is shortened to 1.9 seconds, and chunk 204 is shortened to 1.7 seconds. Each of chunks 201-204 may be reduced in duration by having video adjustment components 122 select and remove one or more video frames from each of chunks 201-204, for example using techniques such as those described below.

Figure 3:
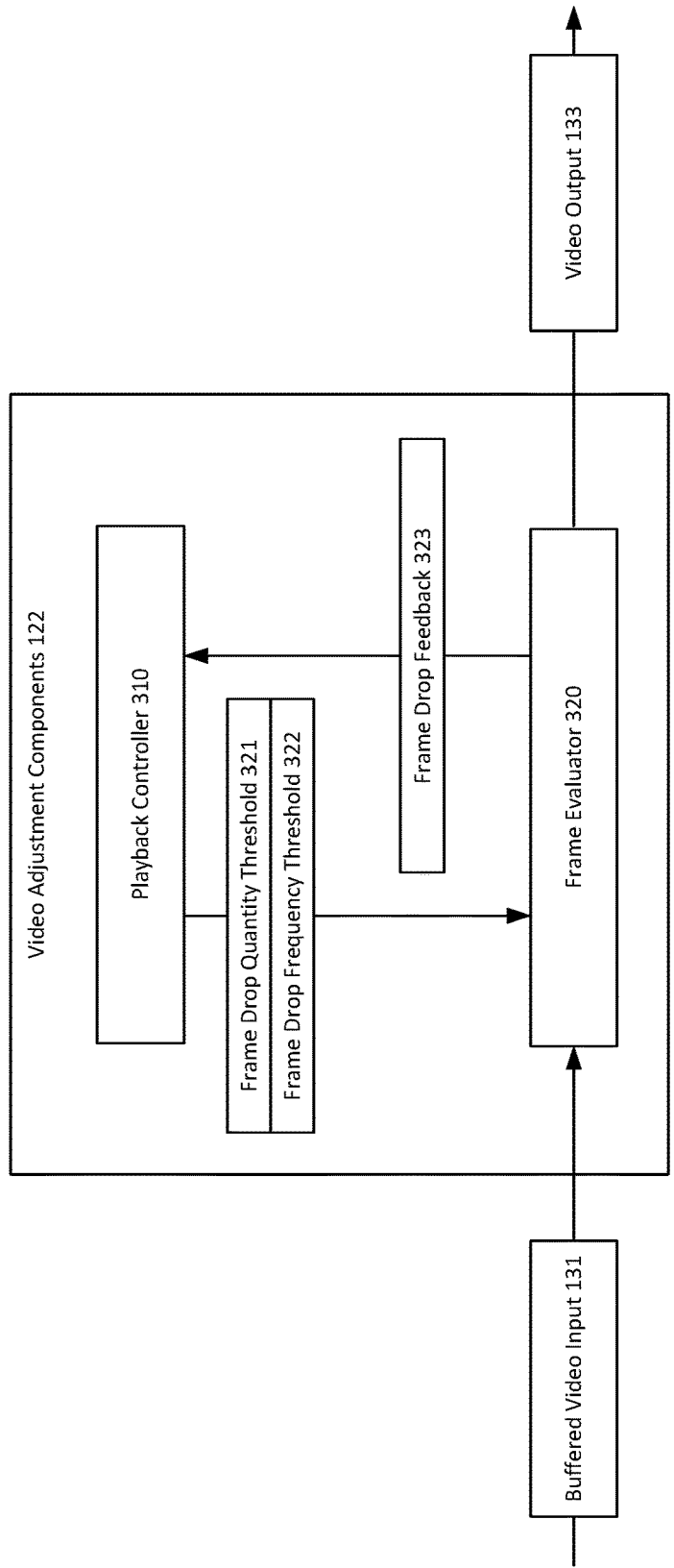
FIG. 3 is diagram illustrating example video adjustment components that may be used in accordance with the present disclosure.

Referring now to FIG. 3, some example video adjustment components 122 will now be described in detail. In particular, in the example of FIG. 3, video adjustment components 122 include a playback controller 310 and a frame evaluator 320. In some examples, playback controller 310 may monitor the transmission of video stream 115 determine when one or more network conditions associated with the transmission are stable. For example, playback controller 310 may by monitor various network conditions (e.g., bandwidth, loss rates, etc.) and determining that the network conditions have remained favorable and/or stable (e.g., above a particular threshold, within a particular range, etc.), for example for at least a particular threshold time duration. In response to such a determination of stability, playback controller 310 may then determine to reduce a quantity of video frames that are stored in the video frame buffer 121, thereby potentially reducing end-to-end latency. As set forth above, for a receiver 120 with stable network conditions, having an excessive amount of video in video frame buffer 121 may be unnecessary and may cause a poor user experience.

In some examples, upon determining to reduce a quantity of video frames that are stored in the video frame buffer 121, playback controller 310 may determine a frame drop quantity threshold 321, which is a maximum quantity of video frames that should be removed from the video frame buffer 121 by dropping video frames from the video output 133. The playback controller 310 may calculate the frame drop quantity threshold 321 by, for example, determining a current quantity of frames in the video frame buffer 121 and determining a minimum quantity of frames to retain in the video frame buffer 121 after reduction. The frame drop quantity threshold 321 may then be set as the difference between the current quantity of frames and the minimum quantity of frame to retain after reduction. Additionally, in some examples, playback controller 310 may also determine a frame drop frequency threshold 322, which is a maximum quantity of video frames that should be removed from the video frame buffer 121 by dropping video frames from the video output 133, which may be a maximum frequency (e.g., one out of ten frames) of video frames that are permitted to be dropped from the video output 133. The frame drop frequency threshold 322 may help to ensure that the video output 133 does not incur noticeable video and audio artifacts (e.g., skipping too many video frames, pops in the audio, etc.). Playback controller 310 may then send indications of the determined frame drop quantity threshold 321 and frame drop frequency threshold 322 to frame evaluator 320.

Frame evaluator 320 may use the frame drop quantity threshold 321, frame drop frequency threshold 322, and other frame information to select one or more frames from buffered video input 131 to drop from video output 133. In some examples, a video frame may be selected for dropping based, at least in part, on a quantity of dropped video frames, a frequency of dropped video frames, and/or whether the video frame is a reference frame. For example, in some cases, a video frame may be dropped when the video frame is a non-reference frame, when dropping of the video frame will not exceed the frame drop quantity threshold, and when dropping of the video frame will not exceed the frame drop frequency threshold. Otherwise, the video frame may not be dropped.

Figure 4:
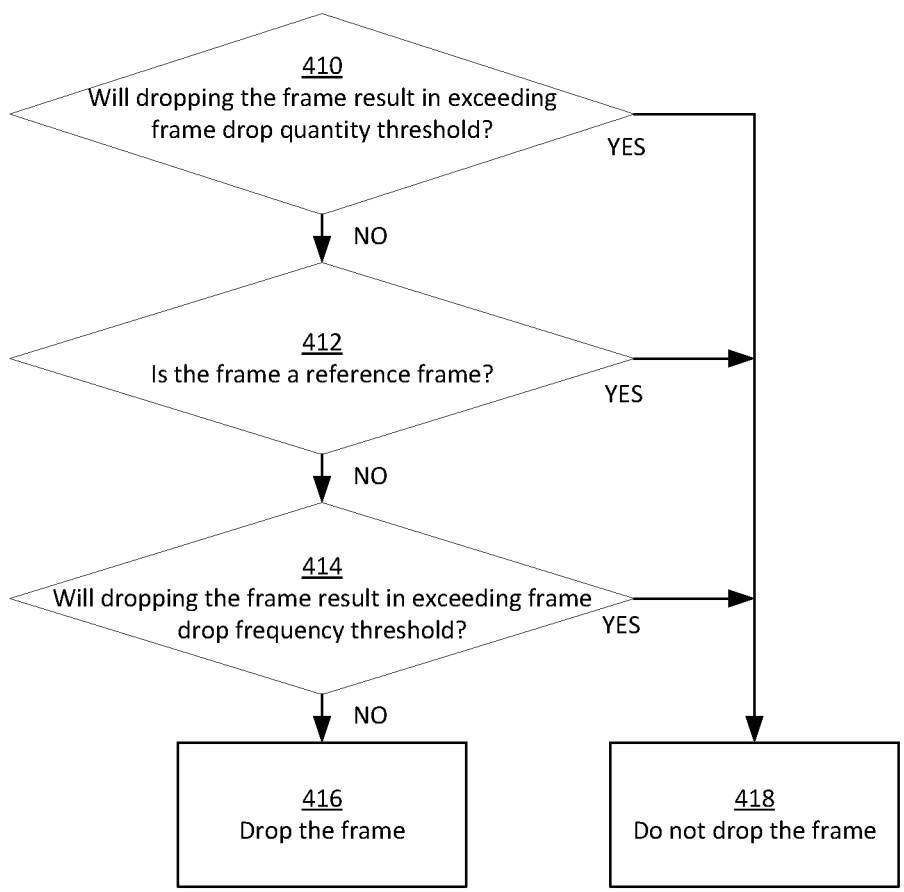
FIG. 4 is a flowchart illustrating an example process for dropped video frame selection that may be used in accordance with the present disclosure.

In some examples, for each of one or more frames in buffered video input 131, frame evaluator 320 may evaluate the frame by employing a process such as the example shown in FIG. 4 in order to determine whether the frame should be dropped from the video output 133. In particular, the process of FIG. 4 is initiated at operation 410, at which it is determined whether dropping the video frame will result in exceeding the frame drop quantity threshold 321. For example, in some cases, frame evaluator 320 may maintain a count of a quantity of frames that have been dropped during the frame buffer reduction process. Frame evaluator 320 may then compare this count to the frame drop quantity threshold 321. If the count is less than the frame drop quantity threshold 321, then it may be determined that dropping the frame will not result in exceeding the frame drop quantity threshold 321. By contrast, if the count is equivalent to the frame drop quantity threshold 321, then it may be determined dropping the frame will result in exceeding the frame drop quantity threshold 321. For example, if the frame drop quantity threshold 321 is set to ten and the maintained count indicates that nine frames have already been dropped, then dropping another frame will not result in exceeding the frame drop quantity threshold 321. By contrast, if the frame drop quantity threshold 321 is set to ten and the maintained count indicates that ten frames have already been dropped, then dropping another frame will result in exceeding the frame drop quantity threshold 321. If dropping the frame will result in exceeding the frame drop quantity threshold 321, then, at operation 418, a determination is made not to drop the frame. If, on the other hand, dropping the frame will not result in exceeding the frame drop quantity threshold 321, then the process proceeds to operation 412.

At operation 412, it is determined whether the frame being evaluated is a reference frame. For example, frame evaluator 320 may examine the frame and/or information associated therewith to determine whether the frame is a reference frame. A reference frame is a frame that is referenced by another frame. For example, another frame may include motion-compensated difference information relative to a reference frame. In some examples, an indication of whether a frame is a reference frame may be included in a respective frame header, for example using a flag in the frame header. If the frame being evaluated is a reference frame, then, at operation 418, a determination is made not to drop the frame. If, on the other hand, the frame being evaluated is not a reference frame, then the process proceeds to operation 414.

At operation 414, it is determined whether dropping the video frame will result in exceeding the frame drop frequency threshold 322. For example, in some cases, in addition to maintaining a dropped frame quantity count, frame evaluator 320 may also maintain information about the position, order and/or timing of the dropped frames (e.g., timestamp information) within the buffered video input 131. Frame evaluator 320 may use this dropped frame quantity count and position, order and/or timing information to determine whether dropping of the frame being evaluated will result in exceeding the frame drop frequency threshold 322. If dropping the frame will result in exceeding the frame drop frequency threshold 322, then, at operation 418, a determination is made not to drop the frame. If, on the other hand, dropping the frame will not result in exceeding the frame drop frequency threshold 322, then, at operation 416, a determination is made to drop the frame.

It is noted that the process of FIG. 4 merely depicts one example of how incoming frames may be evaluated and selected for dropping and that other processes may also be employed. For example, in some cases, for video chunks that do not include non-reference frames (or that include only a single or other small quantity of non-reference frames), a determination may sometimes be made to drop one or more frames at the end of the chunk.

Referring back to FIG. 3, it is seen that frame evaluator 320 may provide frame drop feedback 323 to playback controller 310. Frame drop feedback 323 may include feedback information regarding dropped frames, such as indicating a quantity of frames that are dropped from video output 133, their respective timestamps, and/or other feedback information. This may assist playback controller 310 in making subsequent control decisions regarding video stream 115, for example regarding dropping of frames or other control determinations.

Figure 5:
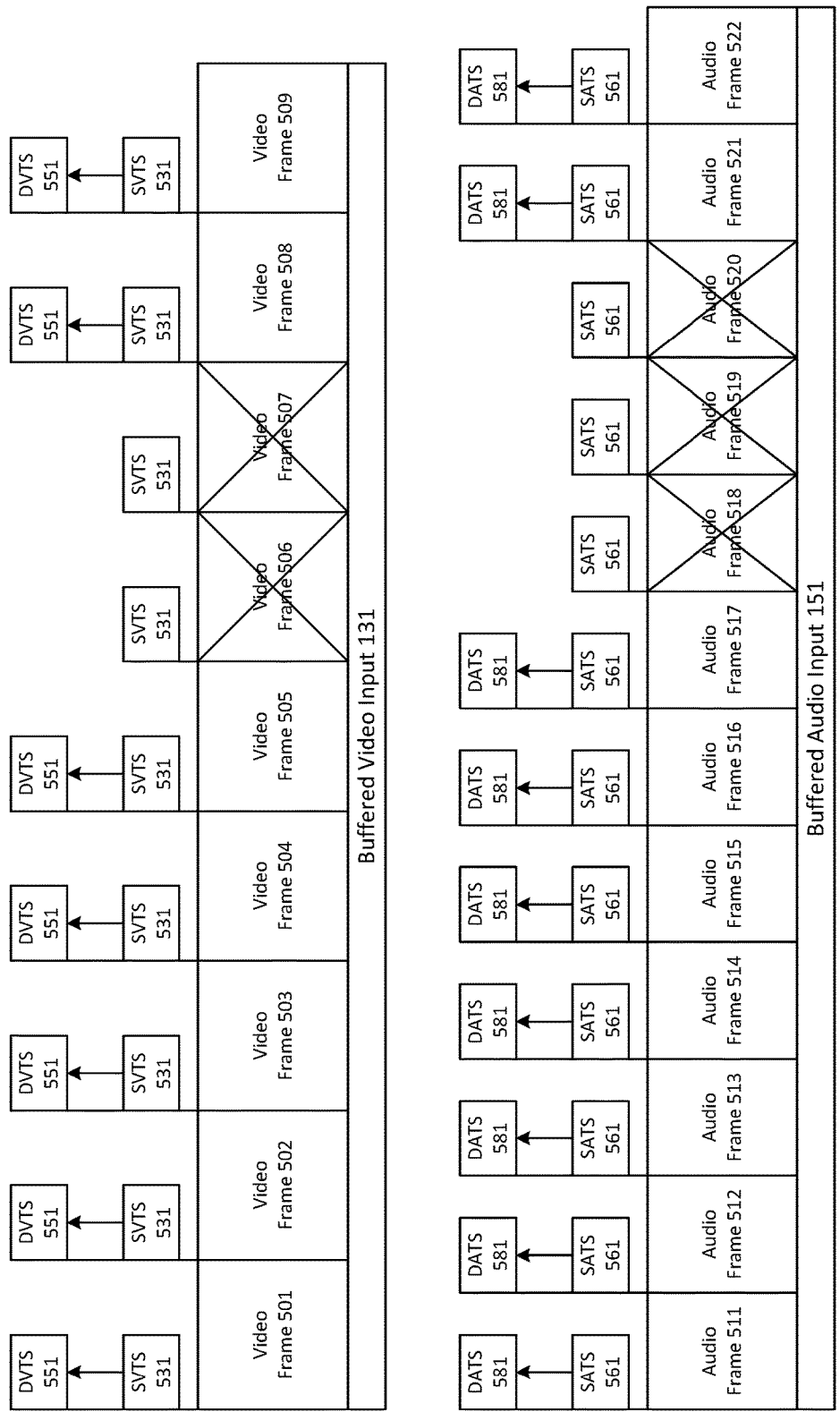
FIG. 5 is a diagram illustrating example source and destination video and audio timestamps that may be used in accordance with the present disclosure.

In some examples, each of the video frames within buffered video input 131 may have a respective timestamp associated with the video frame buffer, referred to herein as source video timestamp. The source video timestamp may, for example, indicate a relative time at which a respective video frame would be presented in the video output 133 if no video frames were dropped. Thus, the source video timestamp does not account for dropped video frames. In some examples, a respective destination video timestamp associated with the video output may be assigned to each undropped video frame that is included in the video output. The destination video timestamp may, for example, indicate a relative time at which a respective video frame will be presented in the video output 133 and may also account for dropped video frames. Referring now to FIG. 5, some examples of source and destination video timestamps will now be described in detail. In particular, in the example of FIG. 5, an example portion of buffered video input 131 is shown that includes video frames 501-509. As shown in FIG. 5, a determination is made to drop video frames 506 and 507 from video output 133, as depicted in FIG. 5 by the X symbol drawn through video frames 506 and 507. As also shown in FIG. 5, each video frame 501-509 is assigned a respective source video timestamp (SVTS) 531. Additionally, each undropped video frame (i.e., video frames 501-505, 508 and 509) is assigned a respective destination video timestamp (DVTS) 551. A destination video timestamp 551 for an undropped video frame may be determined by adding the video frame duration to the destination video timestamp 551 of a prior undropped video frame in the video output 133. For example, the destination video timestamp 551 of video frame 508 may be determined by adding the video frame duration to the destination video timestamp 551 of video frame 505.

In some examples, a video timestamp difference may also be determined for each undropped video frame, which is the difference between the source and destination timestamps 531 and 551 for the respective undropped video frame. In the beginning of the buffered video input of 131 (i.e., prior to dropping of any frames), the source video timestamp 531 and the destination video timestamp 551 may be identical for each frame (i.e., for each of video frames 501-505). Thus, for video frames 501-505, the video timestamp difference may be zero. However, after dropping of frames 506 and 507, the source video timestamp 531 and the destination video timestamp 551 may no longer be identical, and the video timestamp difference may, therefor, become greater than zero. In particular, the destination video timestamp 551 of frame 508 may be set to the value of the source video timestamp 531 of frame 506. Additionally, the destination video timestamp 551 of frame 509 may be set to the value of the source video timestamp 531 of frame 507. Thus, it can be observed that the video timestamp difference for a video frame may be equivalent to the number of prior dropped frames multiplied by the duration of the video frame. For example, for frames 508 and 509, there are two prior dropped frames (i.e., frames 506 and 507), and the video timestamp difference is, therefore, equal to the video frame duration multiplied by two.

Buffered audio frames may also be dropped from the resulting audio output 153 presented to the viewer. In some cases, similar to the video frames, each buffered audio frame may have a respective source timestamp associated with the audio frame buffer, referred to herein as source video timestamp. The source audio timestamp may, for example, indicate a relative time at which a respective audio frame would be presented in the audio output 153 if no audio frames were dropped. Thus, the source audio timestamp does not account for dropped audio frames. In some examples, a respective destination audio timestamp associated with the audio output may be assigned to each undropped audio frame that is included in the audio output. The destination audio timestamp may, for example, indicate a relative time at which a respective audio frame will be presented in the audio output and may also account for dropped audio frames. Referring now to FIG. 5, some examples of source and destination audio timestamps will now be described in detail. In particular, in the example of FIG. 5, an example portion of buffered audio input 151 is shown that includes audio frames 511-522. As shown in FIG. 5, a determination is made to drop audio frames 518, 519 and 520 from audio output 153, as depicted in FIG. 5 by the X symbol drawn through audio frames 518, 519 and 520. As also shown in FIG. 5, each audio frame 511-522 is assigned a respective source audio timestamp (SATS) 561. Additionally, each undropped audio frame (i.e., audio frames 511-517, 521 and 522) is assigned a respective destination audio timestamp (DATS) 581. A destination audio timestamp 581 for an undropped audio frame may be determined by adding the audio frame duration to the destination audio timestamp 581 of a prior undropped audio frame in the audio output 153. For example, the destination audio timestamp 581 of audio frame 521 may be determined by adding the audio frame duration to the destination audio timestamp 581 of audio frame 517.

An audio timestamp difference may also be determined for each undropped audio frame, which is the difference between the source and destination timestamps 561 and 581 for the respective undropped audio frame. In the beginning of the buffered audio input of 151 (i.e., prior to dropping of any frames), the source audio timestamp 561 and the destination audio timestamp 581 may be identical for each frame (i.e., for each of audio frames 511-517). Thus, for audio frames 511-517, the audio timestamp difference may be zero. However, after dropping of frames 518, 519 and 520, the source audio timestamp 561 and the destination audio timestamp 581 may no longer be identical, and the audio timestamp difference may, therefore, become greater than zero. In particular, the destination audio timestamp 581 of frame 521 may be set to the value of the source audio timestamp 561 of frame 518. Additionally, the destination audio timestamp 581 of frame 522 may be set to the value of the source audio timestamp 561 of frame 519. Thus, it can be observed that the audio timestamp difference for an audio frame may be equivalent to the number of prior dropped frames multiplied by the duration of the audio frame. For example, for frames 521 and 522, there are three prior dropped frames (i.e., frames 518, 519 and 520), and the audio timestamp difference is, therefore, equal to the audio frame duration multiplied by three.

In some examples, in order to help ensure that the respective audio content remains relatively well synchronized to the video content, audio frames may only be dropped when certain conditions are met. For example, in some cases, audio frames may be dropped based, at least in part, on a relationship between the audio timestamp difference and the video timestamp difference. In one specific example, audio frames may be prohibited from being dropped when the video timestamp difference (VTSD) is less than the audio timestamp difference (ATSD) in combination with an additional amount, such as half of the audio frame duration (AFD). Otherwise, the audio frames may be dropped. The above example may be expressed using a mathematical formula as shown below:

Do not drop audio frame when: VTSD<ATSD+ (0.5*AFD)

Dropping audio frames based on a relationship between the video timestamp difference and the audio timestamp difference, such as the relationship represented by the mathematical formula above, may prevent long-term drift between respective portions of audio and video content. For example, in FIG. 5, video frames 506 and 507 are dropped, and audio frames 518, 519 and 520 are also dropped based on the relationship represented by the mathematical formula above. In this example, in the resulting outputs, audio is slightly ahead of video, but within half a duration of an audio frame. After dropping of an audio frame, the audio timestamp difference may be updated from a prior audio timestamp difference (ATSD(P)) to a new audio timestamp difference (ATSD(N)) by adding the audio frame duration (AFD) to the prior audio timestamp difference (ATSD(P)). This may be indicated using a mathematical formula as shown below:

ATSD(N)=ATSD(P)+(1*AFD)

Thus, dropping audio frames results in increasing the audio timestamp difference as shown and described above.

When an audio frame is dropped, the dropping of the frame will cause the resulting audio output 153 to include two or more adjacent audio frames that were not originally adjacent to each other in the buffered audio input 151. For example, as shown in FIG. 5, the dropping of audio frames 518, 519 and 520 may cause audio frames 517 and 521 to be positioned adjacent to one another in the resulting audio output 153 (even though audio frames 517 and 521 were not originally adjacent to one another in buffered audio input 151). When audio frames are rearranged such that two arbitrary audio frames (i.e., frames that were not originally adjacent to one another) are positioned adjacent to one another, this may sometimes trigger a popping noise, as the concatenated audio might contain a high frequency component at the frame joint. For example, a popping noise may sometimes occur at the juncture of frames 517 and 521. In some examples, to make this artifact less noticeable, the volume of one or more undropped audio frames adjacent to a dropped audio frame may be lowered.

One possible approach to lowering the audio volume may include transcoding the compressed audio frames. However, this transcoding approach may be computationally expensive and may not be feasible on certain client platforms. Thus, in some examples, an alternative approach may be employed that may include lowering a global gain or other scale factor associated with the audio. For example, one commonly employed audio format for hypertext transfer protocol (HTTP) streaming is the Advanced Audio Coding (AAC) format. In the AAC format, an AAC frame may have an individual_channel_stream( ) data structure that includes a global_gain field. The global_gain is the scale factor applied to the AAC's decoded result pulse-code modulation (PCM), so it may be used to control the overall volume of AAC frames without transcoding. Thus, to lower the volumes of AAC frames around the dropped frame boundaries, the values of global_gain fields for those frames may be lowered, for example without transcoding the compressed audio frames.

Some example processes for reducing a quantity of video frames stored in a video frame buffer during transmission of a video stream will now be described in detail with respect to FIGS. 6 and 7. The processes of FIGS. 6 and 7 may allow video buffer frame reduction to be performed without changing a frame rate of a respective video output during playing of the video output. The processes of FIGS. 6 and 7 may be performed in response to a determination to reduce the quantity of video frames stored in a video frame buffer, which, as set forth above, may be based, at least in part, on a stability of the video stream (e.g., a determination that the video stream has stabilized).

Figure 6:
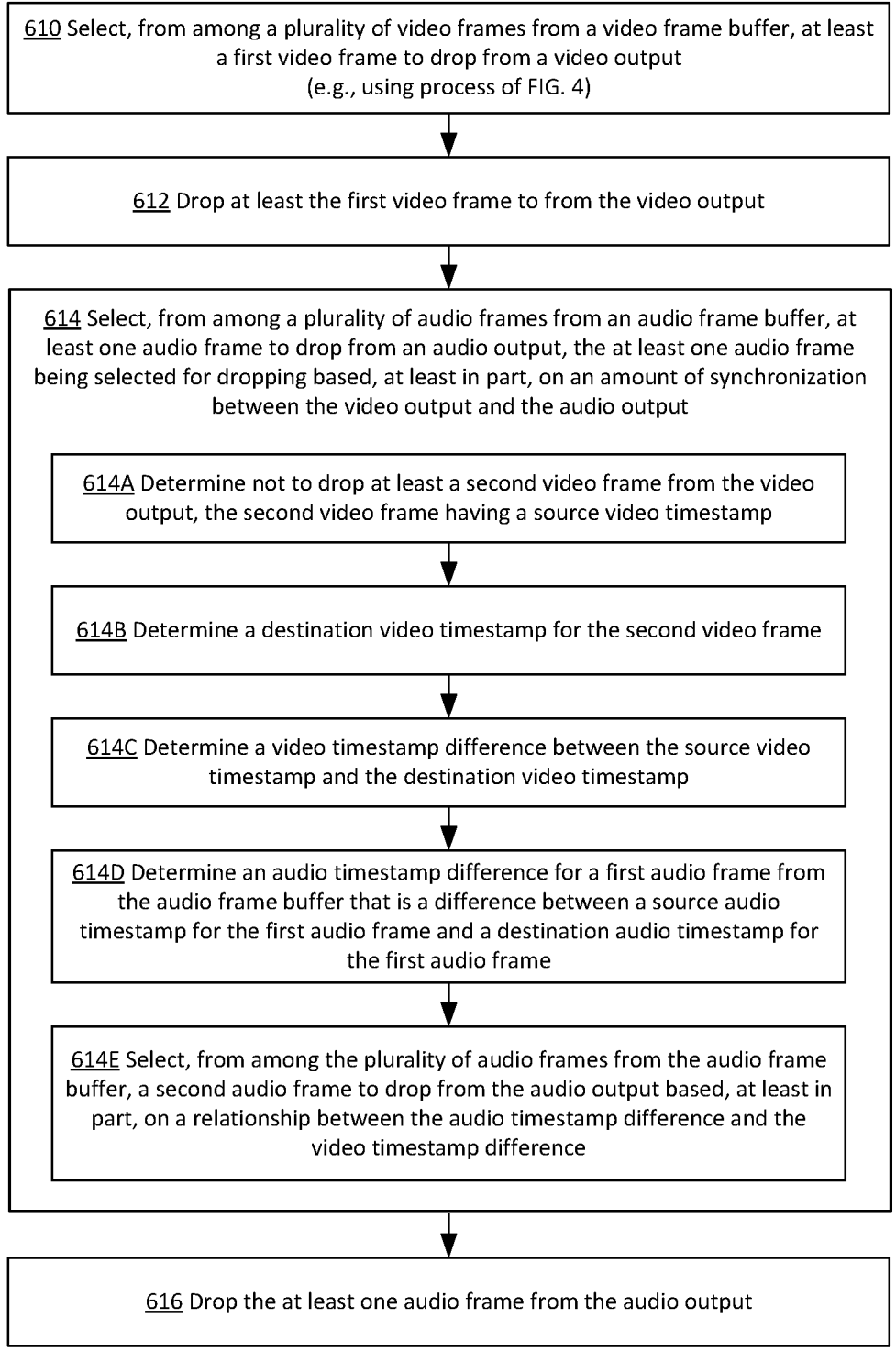
FIG. 6 is a flowchart illustrating a first example process for reducing a quantity of video frames stored in a video frame buffer during transmission of a video stream that may be used in accordance with the present disclosure.

FIG. 6 is a flowchart illustrating a first example process in which audio frames are dropped based, at least in part, on a relationship between the audio timestamp difference and the video timestamp difference. The process of FIG. 6 is initiated at operation 610, at which at least a first video frame is selected, from among a plurality of video frames from a video frame buffer, to drop from a video output. In some examples, the first video frame may be selected for dropping based, at least in part, on a quantity of dropped video frames, a frequency of dropped video frames, and/or whether the first video frame is a reference frame. For example, in some cases, a video frame may be selected for dropping based on the video frame being a non-reference frame, dropping of the video frame not exceeding the frame drop quantity threshold, and dropping of the video frame not exceeding the frame drop frequency threshold. Otherwise, the video frame may not be dropped. An example process for selecting of video frames for dropping is described in detail above with reference to FIG. 4 and is not repeated here. Dropping the at least first video frame may reduce latency between transmitting of video frames in the video stream and playing of the video frames in a respective video output. At operation 612, the at least first video frame is dropped from the video output. For example, as shown in FIG. 5, video frames 506 and 507 are dropped from resulting video output 133.

At operation 614, at least one audio frame to drop from an audio output is selected from among a plurality of audio frames from an audio frame buffer. The least one audio frame is selected for dropping based, at least in part, on an amount of synchronization between the video output and the audio output. For example, in some cases, dropping of video frames may potentially result in portions of the video output being unsynchronized with corresponding portions of the audio output. In these cases, audio frames may sometimes be dropped in order to help ensure that corresponding portions of the audio output are not played too far in advance of corresponding portions of the video output.

In some examples, operation 614 may include sub-operations 614A-E, which may, in some cases, be repeated as part of operation 614 for different frames in the audio output. In particular, at sub-operation 614A, it is determined not to drop at least a second video frame from the video output. For example, as shown in FIG. 5, video frame 508 is not dropped from resulting video output 133. The determination not to drop the second video frame may be based on a frame dropping selection process such as is described in detail above with reference to FIG. 4 and is not repeated here. The undropped second video frame may have a source video timestamp associated with the video frame buffer.

At sub-operation 614B, a destination video timestamp associated with the video output is determined for the second video frame. As set forth above, the destination video timestamp for an undropped video frame may be determined by adding the video frame duration to the destination video timestamp of a prior undropped video frame in the video output. For example, in FIG. 5, the destination video timestamp 551 of video frame 508 may be determined by adding the video frame duration to the destination video timestamp 551 of video frame 505.

At sub-operation 614C, a video timestamp difference is determined between the source video timestamp and the destination video timestamp. As set forth above, the video timestamp difference for a video frame may be equivalent to the number of prior dropped frames multiplied by the duration of the video frame. For example, in FIG. 5, for frame 508, there are two prior dropped video frames (i.e., frames 506 and 507), and the video timestamp difference for fame 508 is, therefore, equal to the video frame duration multiplied by two.

At sub-operation 614D, an audio timestamp difference for a first audio frame from an audio frame buffer is determined. The audio timestamp difference is a difference between a source audio timestamp for the first audio frame associated with the audio frame buffer and a destination audio timestamp for the first audio frame associated with the audio output. As set forth above, the audio timestamp difference for an audio frame may be equivalent to the number of prior dropped audio frames multiplied by the duration of the audio frame. For example, in FIG. 5, for audio frame 517, there are no prior dropped audio frames, and the audio timestamp difference for fame 517 is, therefore, equal to zero.

At sub-operation 614E, a second audio frame to drop from the audio output is selected from among a plurality of audio frames from the audio frame buffer. The second second audio frame is selected for dropping based, at least in part, on a relationship between the audio timestamp difference and the video timestamp difference. In one specific example, audio frames may be prohibited from being dropped when the video timestamp difference is less than the audio timestamp difference in combination with an additional amount, such as half of the audio frame duration. Otherwise, the audio frames may be dropped. For example, when audio frame 518 is being evaluated for dropping, the video timestamp difference associated with the undropped video frame 508 is equal to the video frame duration multiplied by two. Additionally, the audio timestamp difference associated with prior audio frame 517 is zero. Thus, when audio frame 518 is being evaluated for dropping, the video timestamp difference (video frame duration multiplied by two) is not less than the audio timestamp difference (zero) in combination with half of the audio frame duration. Accordingly, a determination is made to drop audio frame 518.

As another example, when audio frame 519 is being evaluated for dropping, the video timestamp difference associated with the undropped video frame 509 is equal to the video frame duration multiplied by two. Additionally, the audio timestamp difference associated with prior audio frame 518 is equal to the number of prior dropped audio frames (one) multiplied by the duration of the audio frame. Thus, when audio frame 519 is being evaluated for dropping, the video timestamp difference (video frame duration multiplied by two) is not less than the audio timestamp difference (audio frame duration multiplied by one) in combination with half of the audio frame duration. Accordingly, a determination is made to drop audio frame 519. As should be appreciated, the above process may also be repeated in order to select audio frame 520 for dropping from the audio output.

At operation 616, the one or more audio frames selected at operation 614 are dropped from the audio output. This may include dropping of the second audio frame selected for dropping at sub-operation 614E from the audio output (for example for multiple different repetitions of sub-operations 614A-E).

Thus, FIG. 6 illustrates a first example process in which audio frames are dropped based, at least in part, on a relationship between the audio timestamp difference and the video timestamp difference. However, in some examples, an alternative approach may be employed in which an audio sampling frequency is increased and video frames are dropped based, at least in part, on a relationship between the audio timestamp difference and the video timestamp difference. In some examples, this alternative approach may be particularly advantageous for group of pictures (GOP) structures that allow frames to be dropped more freely, such as video streams that employ hierarchical B-frames. In some cases, the alternative approach of increasing the audio sampling frequency may result in reducing audio artifacts, such as surrounding dropped frames, which may improve the user experience. By contrast, in some examples, the first approach, an example of which is illustrated in FIG. 6, may be particularly advantageous for video streams including arbitrary group of pictures (GOP) structures in which fewer frames may typically be droppable.

Figure 7:
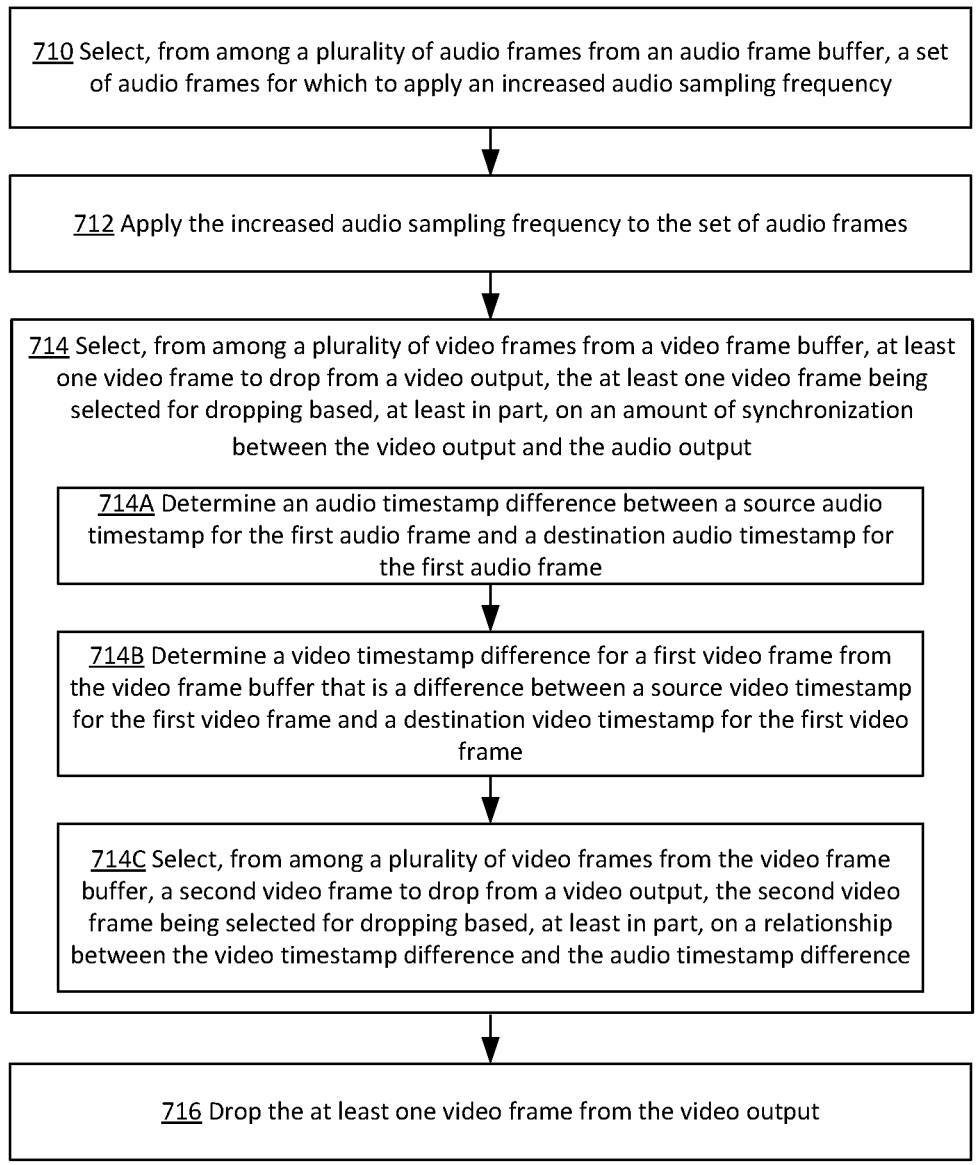
FIG. 7 is a flowchart illustrating a second example process for reducing a quantity of video frames stored in a video frame buffer during transmission of a video stream that may be used in accordance with the present disclosure.

FIG. 7 is a flowchart illustrating a process that provides an example of the alternative approach described above in which audio sampling frequency is increased. The process of FIG. 7 is initiated at operation 710, at which a set of audio frames, from among a plurality of audio frames from an audio frame buffer, for which to apply an increased audio sampling frequency is selected. The increased audio sampling frequency may be increased relative to an audio sampling frequency applied to one or more other audio frames in an audio output. In some examples, the set of audio frames may include one or more audio frames that are contiguous and/or non-contiguous (e.g., that are spaced apart from other audio frames in the set). In some examples, the set of audio frames for which to increase audio sampling frequency may be selected, for example by frame evaluator 320 of FIG. 3, based, at least in part, on the frame drop quantity threshold 321 and/or frame drop frequency threshold 322 of FIG. 3. For example, when the frame drop quantity threshold 321 and/or frame drop frequency threshold 322 are relatively large, then a relatively large quantity of audio frames for which to increase audio sampling frequency may sometimes be selected. By contrast, in some examples, when the frame drop quantity threshold 321 and/or frame drop frequency threshold 322 are relatively small, then a relatively small quantity of audio frames for which to increase audio sampling frequency may sometimes be selected. Also, in some examples, a lower frame drop frequency threshold 322 may cause certain selected audio frames in the set to be spaced apart further from one another or otherwise selected less frequently over a particular period. At operation 712, the increased audio sampling frequency is applied to the set of audio frames selected at operation 710. The audio sampling frequency may remain unchanged for the remaining frames from the audio stream.

At operation 714, at least one video frame to drop from a video output is selected from among a plurality of video frames from a video frame buffer. The least one video frame is selected for dropping based, at least in part, on an amount of synchronization between the video output and the audio output. For example, in some cases, increasing the audio sampling frequency for the set of audio frames may potentially result in portions of the video output being unsynchronized with corresponding portions of the audio output. In these cases, video frames may sometimes be dropped in order to help ensure that corresponding portions of the audio output are not played too far in advance of corresponding portions of the video output.

In some examples, operation 714 may include sub-operations 714A-C, which may, in some cases, be repeated as part of operation 714 for different frames in the video output. At sub-operation 714A, an audio timestamp difference for a first audio frame in the set of audio frames is determined. In particular, as described above, each audio frame from the audio stream may have a source audio timestamp associated with the audio frame buffer. Additionally, because there are no dropped audio frames in alternative approach of FIG. 7, each audio frame may also have a destination audio timestamp associated with the audio output. As set forth above, an audio timestamp difference for an audio frame is the difference between its source audio timestamp and its destination audio timestamp. It is noted, however, that the process of calculating an audio timestamp difference for the alternative approach of FIG. 7 is different than that employed for the prior approach of FIG. 6. In particular, for the alternative approach of FIG. 7, the audio timestamp difference may be calculated based on the increased sampling frequency as opposed to being calculated based upon prior dropped audio frames. Specifically, for the alternative approach of FIG. 7, for each sampling frequency increased audio frame, a new audio timestamp difference for that audio frame may be calculated using an equation 810 as shown in FIG. 8. In particular, FIG. 8 depicts equation 810 as well as key 815, which includes an explanation of the abbreviations used in equation 810. As shown in FIG. 8, a new audio timestamp difference for a sampling frequency increased audio frame may be calculated by taking the prior audio timestamp difference (e.g., for the prior audio frame in the audio stream), adding a first ratio, and subtracting a second ratio. The first ratio is the number of audio samples in an audio frame divided by the original (i.e., prior to increase) audio frame sampling frequency. The second ratio is the number of audio samples in an audio frame divided by the increased audio frame sampling frequency. Thus, for a sampling frequency increased audio frame, the audio timestamp difference increases relative to the previous frame. In order words, the audio frames will be played out at a consistently faster speed when the audio sampling frequency is increased. Accordingly, an audio timestamp difference for a first audio frame in the set of audio frames may be determined, for example using equation 810 of FIG. 8.

Referring back to FIG. 7, at sub-operation 714B, a video timestamp difference for a first video frame from the video frame buffer is determined. As set forth above, a video timestamp difference for a video frame is the difference between its source video timestamp and its destination video timestamp. In particular, as described above, each video frame from the video stream may have a source video timestamp associated with the video frame buffer. As also described above, undropped video frames in the video output may have a destination video timestamp associated with the video output. The destination video timestamp for an undropped video frame may be determined by adding the video frame duration to the destination video timestamp of a prior undropped video frame in the video output.

At sub-operation 714C, a second video frame, from among a plurality of video frames from the video frame buffer, is selected to drop from the video output. It is noted, that, in the alternative approach of FIG. 7, different criteria may be employed for dropped video frame selection than were employed in the prior approach of FIG. 6. In particular, for the alternative approach of FIG. 7, video frames may be dropped based, at least in part, on a relationship between the video timestamp difference and the audio timestamp difference. In one specific example, video frames may be prohibited from being dropped when the video timestamp difference (VTSD) is less than the audio timestamp difference (ATSD) in combination with an additional amount, such as half of the audio frame duration (AFD). Otherwise, the video frames may be dropped. The above example may be expressed using a mathematical formula as shown below:

Do not drop video frame when: VTSD<ATSD+ (0.5*AFD)

Dropping video frames based on a relationship between the video timestamp difference and the audio timestamp difference, such as the relationship represented by the mathematical formula above, may prevent long-term drift between respective portions of audio and video content. After dropping of a video frame, the video timestamp difference may be updated from a prior video timestamp difference (VTSD(P)) to a new video timestamp difference (VTSD(N)) by adding the video frame duration (VFD) to the prior video timestamp difference (VTSD(P)). This may be indicated using a mathematical formula as shown below:

VTSD(N)=VTSD(P)+(1*VFD)

Thus, dropping video frames results in increasing the video timestamp difference as shown and described above.

In some examples, the second video frame may be a frame that directly follows the first video frame in the buffered video input. In this case, at sub-operation 714C, the second video frame may be selected to drop from the video output based, for example, on the video timestamp difference for the first video frame being greater than or equal to the audio timestamp difference in combination with an additional amount, such as half of the audio frame duration.

At operation 716, the at least one video frame selected at operation 714 is dropped from the video output. This may include dropping of the second video frame selected for dropping at sub-operation 714C from the video output (for example for multiple different repetitions of sub-operations 714A-C). As set forth in detail above, dropping of the at least one video frame may reduce latency between transmitting of video frames in the video stream and playing of the video frames in the video output.

Figure 9:
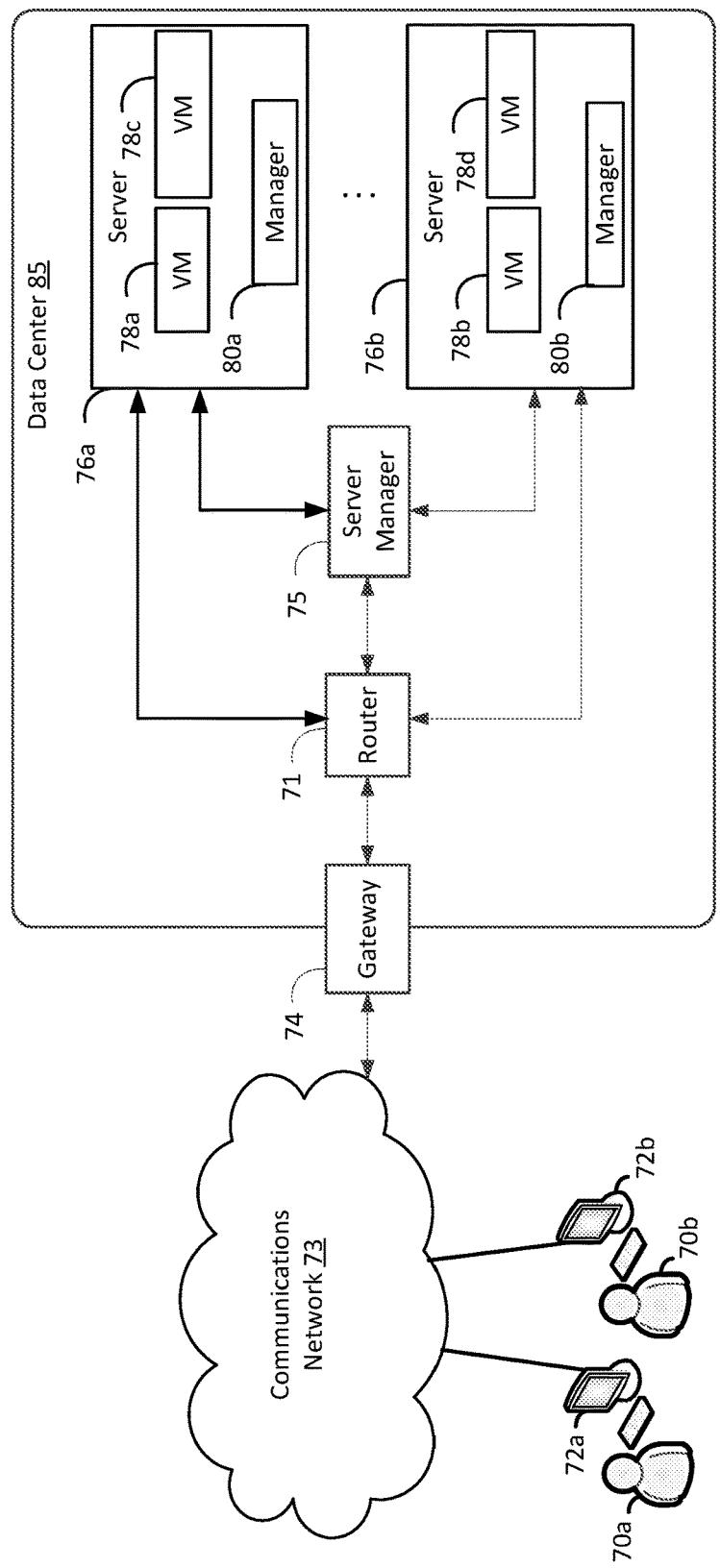
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76a and 76b. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
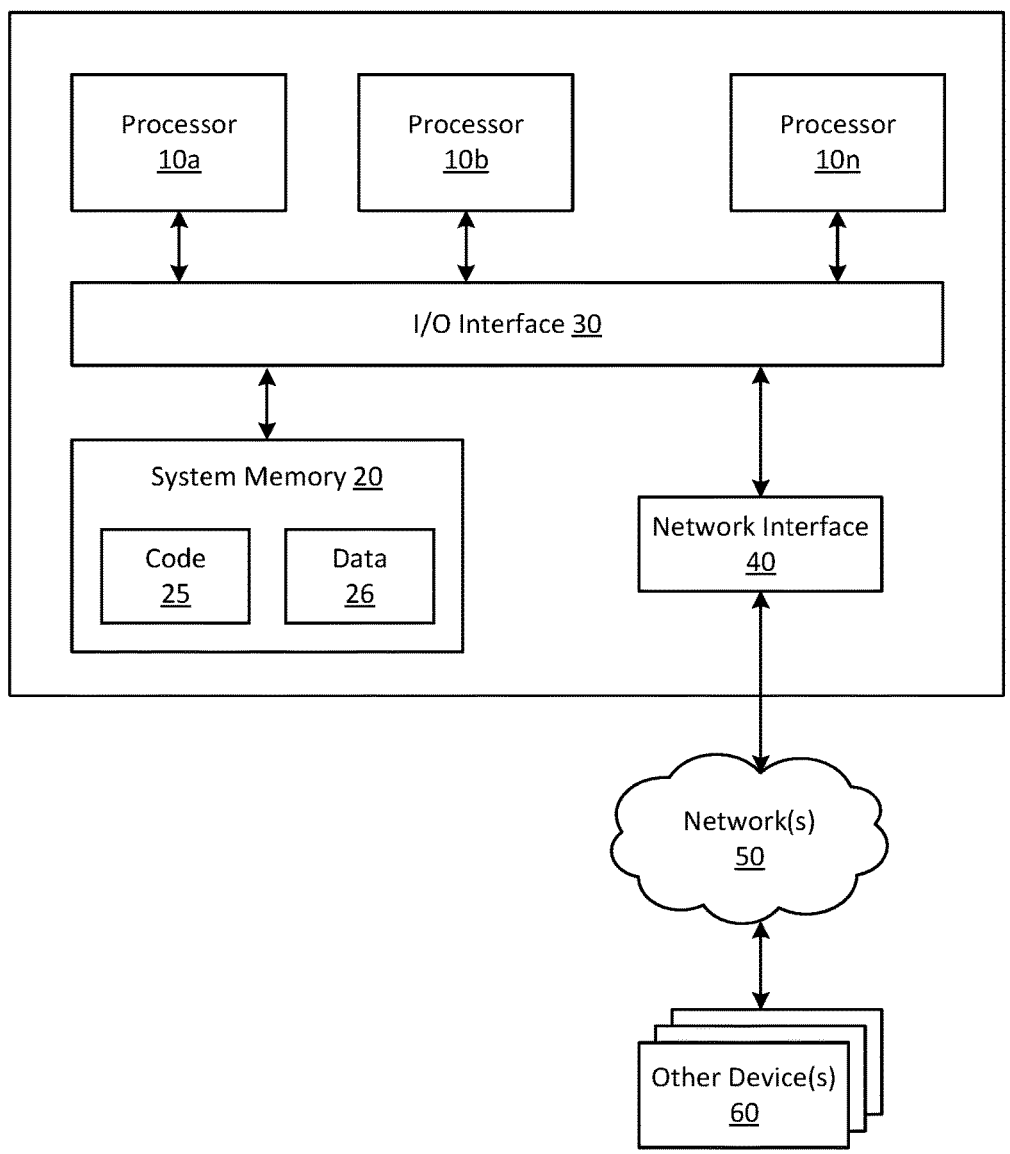
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for reducing a quantity of video frames stored in a video frame buffer during transmission of a video stream comprising:
   one or more processors; and
   one or more memories having stored therein instructions that, upon execution by the one or more processors, cause the computing system perform operations comprising:
      selecting, from among a plurality of video frames from the video frame buffer, at least a first video frame to drop from a video output for display, wherein the first video frame is selected for dropping based, at least in part, on at least one of a quantity of dropped video frames, a frequency of dropped video frames, or whether the first video frame is a reference frame;
      dropping at least the first video frame from the video output;
      determining not to drop at least a second video frame from the video output, the second video frame having a first video timestamp associated with the video frame buffer;
      determining a second video timestamp for the second video frame associated with the video output;
      determining a video timestamp difference between the first video timestamp and the second video timestamp;
      determining an audio timestamp difference for a first audio frame from an audio frame buffer that is a difference between a first audio timestamp for the first audio frame associated with the audio frame buffer and a second audio timestamp for the first audio frame associated with an audio output;
      selecting, from among a plurality of audio frames from the audio frame buffer, a second audio frame to drop from the audio output, wherein the second audio frame is selected for dropping based, at least in part, on a relationship between the audio timestamp difference and the video timestamp difference; and dropping the second audio frame from the audio output.

2. The computing system of claim 1, wherein the video stream is a live video stream having video that is captured from a live event, and wherein playing of at least part of the video output occurs during at least part of the live event.

3. The computing system of claim 1, wherein a frame rate of the video output remains unchanged during playing of the video output.

4. The computing system of claim 1, wherein the first video frame is selected for dropping based on the dropping of the first video frame not exceeding a frame drop quantity threshold, the dropping of the first video frame not exceeding a frame drop frequency threshold, and the first video frame being a non-reference frame.

5. A computer-implemented method for reducing a quantity of video frames stored in a video frame buffer during transmission of a video stream comprising:

selecting, from among a plurality of video frames from the video frame buffer, at least a first video frame to drop from a video output for display, wherein the first video frame is selected for dropping based, at least in part, on at least one of a quantity of dropped video frames, a frequency of dropped video frames, or whether the first video frame is a reference frame;

dropping at least the first video frame from the video output;

determining not to drop at least a second video frame from the video output, the second video frame having a first video timestamp associated with the video frame buffer;

determining a second video timestamp for the second video frame associated with the video output;

determining a video timestamp difference between the first video timestamp and the second video timestamp; and determining an audio timestamp difference for a first audio frame from an audio frame buffer that is a difference between a first audio timestamp for the first audio frame associated with the audio frame buffer and a second audio timestamp for the first audio frame associated with an audio output; and selecting, from among the plurality of audio frames from the audio frame buffer, a second audio frame to drop from the audio output, wherein the second audio frame is selected for dropping based, at least in part, on a relationship between the audio timestamp difference and the video timestamp difference; and dropping the second audio frame from the audio output.

6. The computer-implemented method of claim 5, wherein audio frames are prohibited from being dropped from the audio output when the video timestamp difference is less than the audio timestamp in combination with an additional value.

7. The computer-implemented method of claim 6, wherein the additional value is half a duration of an audio frame.

8. The computer-implemented method of claim 5, further comprising providing feedback indicating a quantity of video frames that are dropped from the video output.

9. The computer-implemented method of claim 5, further comprising lowering a volume of one or more undropped audio frames adjacent to a dropped audio frame.

10. The computer-implemented method of claim 5, wherein the video stream is transmitted using adaptive bitrate streaming.

11. The computer-implemented method of claim 5, wherein the video stream is a live video stream having video that is captured from a live event, and wherein playing of at least part of the video output occurs during at least part of the live event.

12. The computer-implemented method of claim 5, wherein a frame rate of the video output remains unchanged during playing of the video output.

13. The computer-implemented method of claim 5, wherein the dropping the at least first video frame reduces latency between transmitting of video frames in the video stream and playing of the video frames in the video output.

14. The computer-implemented method of claim 5, further comprising determining, based, at least in part, on a stability of the video stream, to reduce the quantity of video frames stored in the video frame buffer.

15. The computer-implemented method of claim 5, wherein the first video frame is selected for dropping based on the dropping of the first video frame not exceeding a frame drop quantity threshold, the dropping of the first video frame not exceeding a frame drop frequency threshold, and the first video frame being a non-reference frame.

16. One or more non-transitory computer-readable storage media having stored thereon instructions that, upon execution by one or more computing devices, cause the one or more computing devices to perform operations comprising:

selecting, from among a plurality of video frames from a video frame buffer, at least a first video frame to drop from a video output for display;

dropping at least the first video frame from the video output;

determining not to drop at least a second video frame from the video output, the second video frame having a first video timestamp associated with the video frame buffer;

determining a second video timestamp for the second video frame associated with the video output;

determining a video timestamp difference between the first video timestamp and the second video timestamp; and determining an audio timestamp difference for a first audio frame from an audio frame buffer that is a difference between a first audio timestamp for the first audio frame associated with the audio frame buffer and a second audio timestamp for the first audio frame associated with an audio output;

selecting, from among a plurality of audio frames from the audio frame buffer, a second audio frame to drop from the audio output, wherein the second audio frame is selected for dropping based, at least in part, on a relationship between the audio timestamp difference and the video timestamp difference; and dropping at least the second audio frame from the audio output.

17. The one or more non-transitory computer-readable storage media of claim 16, wherein the first video frame is selected for dropping based on the dropping of the first video frame not exceeding a frame drop quantity threshold, the dropping of the first video frame not exceeding a frame drop frequency threshold, and the first video frame being a non-reference frame.

18. The one or more non-transitory computer-readable storage media of claim 16, wherein the operations further comprise lowering a volume of one or more undropped audio frames adjacent to a dropped audio frame.

19. The one or more non-transitory computer-readable storage media of claim 16, wherein audio frames are prohibited from being dropped from the audio output when the video timestamp difference is less than the audio timestamp difference in combination with an additional value.

* * * * *